UNITED STATES PATENT OFFICE.

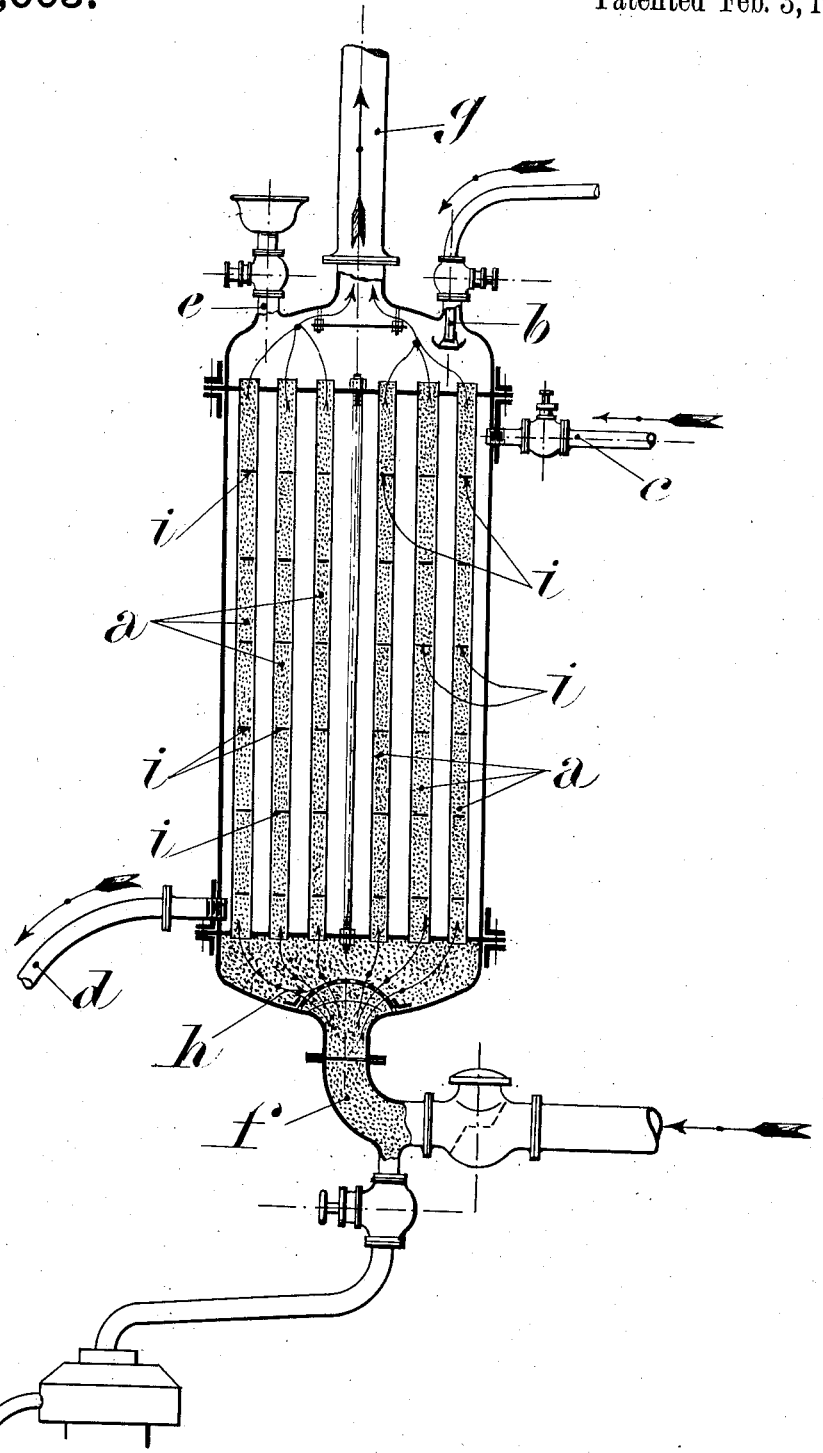

AUGUSTIN RADISSON AND PAUL BERTHON, OF LYON, FRANCE; SAID RADISSON ASSIGNOR OF ALL HIS RIGHT TO SOCIÉTÉ DE STÉARINERIE ET SAVONNERIE DE LYON, OF LYON, FRANCE.

PROCESS FOR PRODUCING CATALYTIC AGENTS FOR REDUCTION OR HYDROGENATION PURPOSES.

1,330,003.    Specification of Letters Patent.    Patented Feb. 3, 1920.

Application filed May 18, 1917. Serial No. 169,531.

*To all whom it may concern:*

Be it known that we, AUGUSTIN RADISSON and PAUL BERTHON, both residing at Lyon, in France, and citizens of the French Republic, have invented certain new and useful Processes for Producing Catalytic Agents for Reduction or Hydrogenation Purposes, of which the following is a specification.

This invention relates to an apparatus for reducing metal oxids or salts and for other purposes.

The annexed drawing illustrates a form of construction of the apparatus which we will describe a process for producing catalytic agents for reduction or hydrogenation purposes described in our co-pending application for patent.

Briefly, this process consists in reducing an oxid or salt of a metal such as nickel, cobalt, copper, etc., in a neutral liquid medium having a high boiling point, such as solid paraffin in the presence of a trace of free fatty acid.

The apparatus is chiefly composed of a tubular group. A mixture of melted paraffin and stearic acid is introduced into the tubes $a$ through the upper pipe $b$.

These tubes are heated to a temperature of 250° C. by means of superheated steam introduced into the casing at $c$ and escaping at $d$.

Oxid of nickel is added through the funnel $e$ then a strong current of hydrogen is injected through the lower pipe $f$. The unused hydrogen escapes through the pipe $g$ and is driven back again and reënters into reaction after having been purified and dried.

The re-agents are maintained during the operation at the temperature of 250° C. and perfect contact between the gas and the mixture of oxid and the melted paraffin is insured by means of a sprinkler $h$ and by a series of finely perforated plates $i$ arranged in the tubes $a$.

What we claim as our invention and desire to secure by Letters Patent of the United States is:—

1. An apparatus for preparing catalysts comprising a series of open ended tubes, means for heating said tubes, a casing surrounding said tubes, means for introducing a liquid into said tubes, means for introducing a metallic oxid into said tubes, means for introducing a current of hydrogen into said casing so as to pass through said tubes, means in said casing for distributing the hydrogen gas in the lower part of said casing and means for distributing the said gas in said tubes.

2. An apparatus for preparing catalysts comprising a series of vertical open ended tubes in said casing disposed so as to leave a free space at the top and at the bottom within said casing, a funnel, an inlet pipe and an outlet pipe in the upper part of said casing, means for introducing steam into said casing to flow around said tubes, means for preventing access of the steam to said upper and lower free spaces, a perforated plate in said lower free space, a series of perforated plates in said tubes and an inlet pipe connected to the bottom of said casing.

In witness whereof we have signed this specification in the presence of two witnesses.

AUGUSTIN RADISSON.
PAUL BERTHON.

Witnesses:
JEAN GERMAIN,
MORIN VACHON.